(12) United States Patent
Mayo, Jr.

(10) Patent No.: US 8,904,702 B2
(45) Date of Patent: Dec. 9, 2014

(54) CONTAINER FOR A SUBSTANCE SUCH AS AN ANT BAIT CONTAINER

(71) Applicant: Roy G. Mayo, Jr., St. Peters, MO (US)

(72) Inventor: Roy G. Mayo, Jr., St. Peters, MO (US)

(73) Assignee: Round Peg Solutions, LLC, St. Peters, MO (US)

( * ) Notice: Subject to any disclaimer, the term of this patent is extended or adjusted under 35 U.S.C. 154(b) by 120 days.

(21) Appl. No.: 13/627,226

(22) Filed: Sep. 26, 2012

(65) Prior Publication Data

US 2014/0082994 A1    Mar. 27, 2014

(51) Int. Cl.
*A01M 1/20*    (2006.01)

(52) U.S. Cl.
USPC ............................................................ 43/131

(58) Field of Classification Search
CPC ....................... A01M 2200/011; A01M 1/2011
USPC ............ 239/34, 60; 206/484–484.2, 469, 470; 220/269, 270, 359.2
See application file for complete search history.

(56) References Cited

U.S. PATENT DOCUMENTS

| | | | |
|---|---|---|---|
| 1,822,307 A * | 9/1931 | Nettekoven ....................... | 43/121 |
| 4,583,686 A * | 4/1986 | Martens et al. ................... | 239/35 |
| 5,357,709 A * | 10/1994 | Lin ................................... | 43/131 |
| 5,439,100 A * | 8/1995 | Gordon et al. .................... | 206/5 |
| 5,452,849 A | 9/1995 | Schramer et al. | |
| 5,826,737 A | 10/1998 | Zakensberg | |
| 6,116,440 A | 9/2000 | Zaksenberg et al. | |
| 6,532,696 B2 | 3/2003 | Clark, III et al. | |
| 7,350,669 B2 | 4/2008 | Rani | |
| D624,399 S | 9/2010 | Hansen et al. | |
| D629,702 S | 12/2010 | Caldwell et al. | |
| 8,091,278 B2 | 1/2012 | Alcazar et al. | |
| 8,156,684 B2 * | 4/2012 | Kirkland et al. ................. | 43/131 |
| 2003/0145511 A1 | 8/2003 | Finn et al. | |
| 2004/0134121 A1 * | 7/2004 | Bianchini et al. ............... | 43/131 |
| 2009/0004424 A1 | 1/2009 | De Almeida et al. | |
| 2010/0205850 A1 | 8/2010 | Bernard | |
| 2012/0128835 A1 | 5/2012 | Lyzenga et al. | |
| 2012/0144729 A1 * | 6/2012 | de Lame et al. ................. | 43/131 |
| 2013/0168463 A1 * | 7/2013 | Dobler et al. .................... | 239/34 |
| 2013/0186974 A1 * | 7/2013 | Dornau et al. ................... | 239/34 |

* cited by examiner

*Primary Examiner* — David Parsley
*Assistant Examiner* — Danielle Clerkley
(74) *Attorney, Agent, or Firm* — Joseph M. Rolnicki; Evans & Dixon, LLC (57) ABSTRACT

A container for a substance, such as an ant trap container for ant bait is comprised of a minimum number of component parts that are each formed in a cost effective manner to produce an inexpensive container. The component parts of the container include a flexible sheet that seals the substance inside the container. The sheet can be easily manually grasped and pulled from an opening of the container to expose the substance to the opening of the container.

20 Claims, 6 Drawing Sheets

CONTAINER FOR A SUBSTANCE SUCH AS AN ANT BAIT CONTAINER

BACKGROUND OF THE INVENTION

1. Field of the Invention

The present invention pertains to a container for a substance, such as an ant bait container. The container is comprised of a minimum number of component parts that are each formed in a cost effective manner to produce the inexpensive container. The component parts of the container include a flexible sheet that seals the substance inside the container. The sheet can be easily manually grasped and pulled from an opening of the container to expose the substance to the opening of the container.

2. Description of the Related Art

There are a large variety of commercially available containers containing evaporative substances, such as ant trap containers containing ant bait. The typical ant trap container includes some type of packaging that seals the ant bait from the exterior environment of the container until the trap is ready for use. Some prior art ant trap containers have packaging that completely surrounds the containers and thereby seals the ant bait in the containers. The packaging is often difficult to tear open and must be cut open with a knife or scissors to use the ant trap. Other types of prior art ant trap containers have portions of the containers themselves that must be cut with a knife or scissors to expose the ant bait in the container prior to use of the ant trap. These types of ant trap containers are disadvantaged in that the user must use a knife or scissors to expose the ant bait inside the containers prior to use of the containers.

SUMMARY OF THE INVENTION

What is needed to overcome the disadvantages associated with the prior art ant trap containers such as those discussed above is an ant bait container that not only seals the ant bait inside the container prior to use, but can be easily opened without the need for a knife or scissors to enable use of the ant trap.

The container of the invention basically has a two-piece construction. One piece forms the exterior of the container and the other piece is a flexible sheet that seals the contents of the container. The basic two-piece construction of the container enables it to be manufactured inexpensively and thereby offered to consumers at a reduced price.

The first piece of the container is molded from semi rigid plastic or other equivalent material and forms both a bottom part and a top part of the container exterior. The bottom part and the top part are connected by a hinge that enables the top part to be folded over and secured to the bottom part. Both the bottom part and top part have rectangular configurations, however other configurations could also be employed with the container.

The container bottom part has a central area that is formed as a receptacle for the ant bait to be contained in the container. The receptacle is formed with a bottom surface. At least one sidewall extends around the bottom surface and extends upwardly from the bottom surface to a top edge of the sidewall. Together the bottom surface and the sidewall form the receptacle of the bottom part. The receptacle has an open top that is surrounded by the sidewall top edge. The open top provides access to the receptacle for the ant bait to be put into the receptacle. A portion of the bottom part that is opposite the hinge is formed with an inclined surface. The inclined surface extends downwardly from the sidewall top edge as it extends away from the receptacle of the bottom part.

The substance in the exemplary embodiment of the container is ant bait, either liquid or solid or granular. Other types of substances such as other insect baits, or fragrances such as air fresheners, or animal repellants could be put on the bottom surface of the receptacle.

A flexible sheet of plastic, foil or other equivalent material is positioned over the container bottom part. The sheet is dimensioned to extend over the central area of the bottom part and over the receptacle open top. In the exemplary embodiment of the invention the sheet is folded over and has a lower piece and an upper piece on opposite sides of the fold. The lower piece extends around the sidewall top edge of the container bottom part and is removably secured to the sidewall top edge. This seals the ant bait in the bottom part receptacle. The sheet upper piece extends from the fold back over the sheet lower piece to a tab of the sheet upper piece. The tab is positioned over the inclined surface of the container bottom part. The folded sheet is dimensioned smaller than the container bottom part so that portions of the container bottom part form a border around the sheet except for the tab of the sheet.

The container top part is folded at the hinge connecting it to the container bottom part and extends over the folded sheet. The container top part has basically the same configuration as the container bottom part. As the top part is folded over the bottom part portions of the top part engage against the portions of the bottom part that border the sheet. The portions of the top part are secured to the portions of the bottom part by adhesives, heat sealing, RF welding or other equivalent means. This secures the top part to the bottom part around a perimeter of the container except for an area adjacent the incline surface of the container bottom part and the folded sheet tab. Here the container top part and bottom part are not secured together, leaving an opening between the top part and the bottom part to the interior of a container. Adjacent the opening the container top part is formed with a tab that projects from the top part. The tab is connected to the top part by a frangible connection, for example a line of perforations. This tab of the top part is secured by adhesives, heating, RF welding or other equivalent means to the tab of the sheet.

In use of the container, the tab of the top part and the connected tab of the sheet can be manually grasped and pulled from the remainder of the container. When top part tab separates from the top part, continued pulling will pull the sheet through the container opening and gradually remove the sheet from over the receptacle of the container bottom part. Removing the sheet from the interior of the container exposes the substance in the receptacle, whereby the container is ready for use as an ant trap.

The container of the invention described above provides an inexpensively and easily manufactured container that can be easily opened and activated by an end user without the need for separate tools such as a knife or scissors.

DESCRIPTION OF THE DRAWINGS

Further features of the container of the invention are set forth in the following detailed description of the container and in the drawing figures.

DETAILED DESCRIPTION

Figure 1:
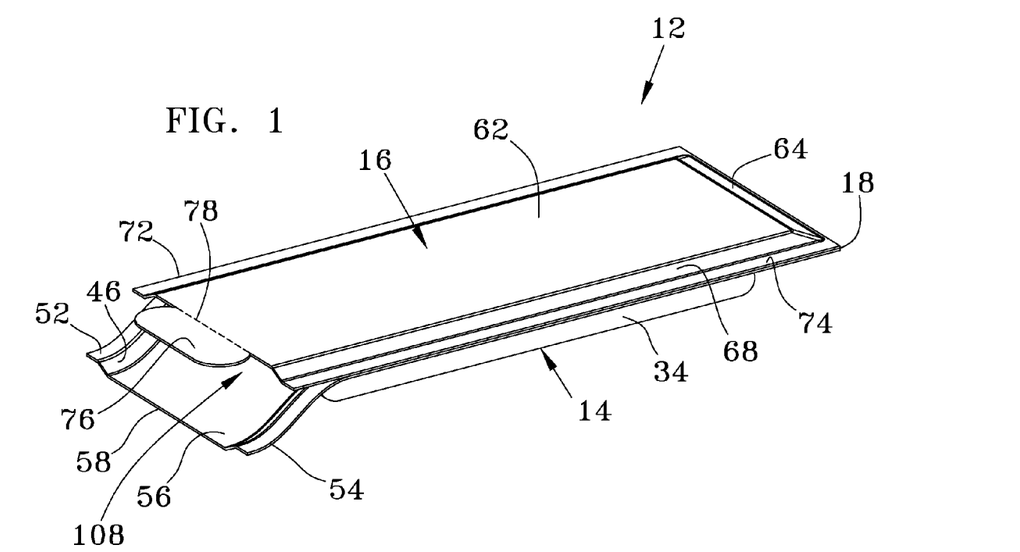
FIG. 1 is a perspective view of the assembled container of the invention.
Figure 2:
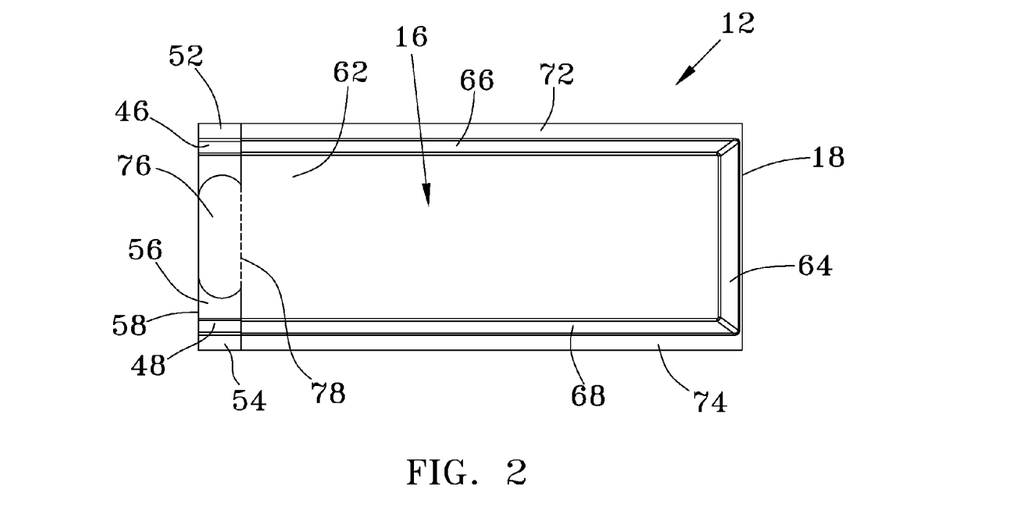
FIG. 2 is a top plan view of the container.
Figure 3:
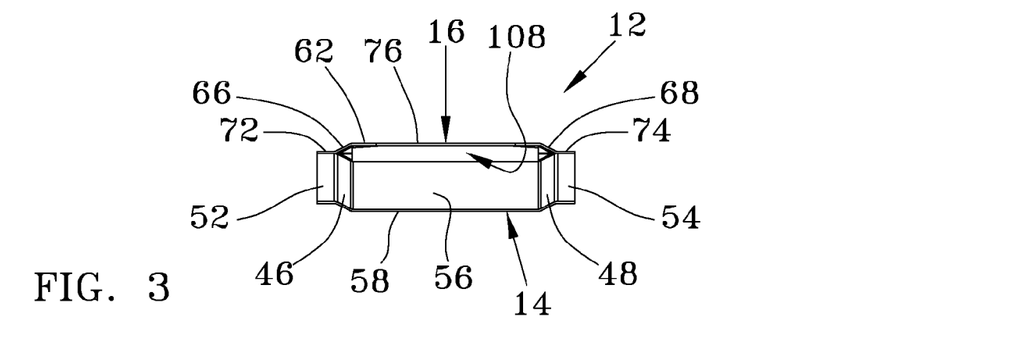
FIG. 3 is a front elevation view of the container.
Figure 4:
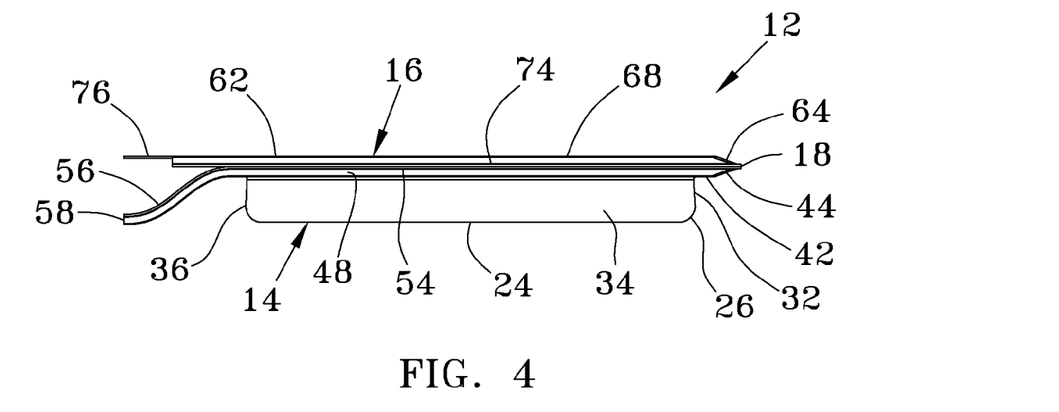
FIG. 4 is a right side elevation view of the container with the left side elevation view being a mirror image thereof.
Figure 5:
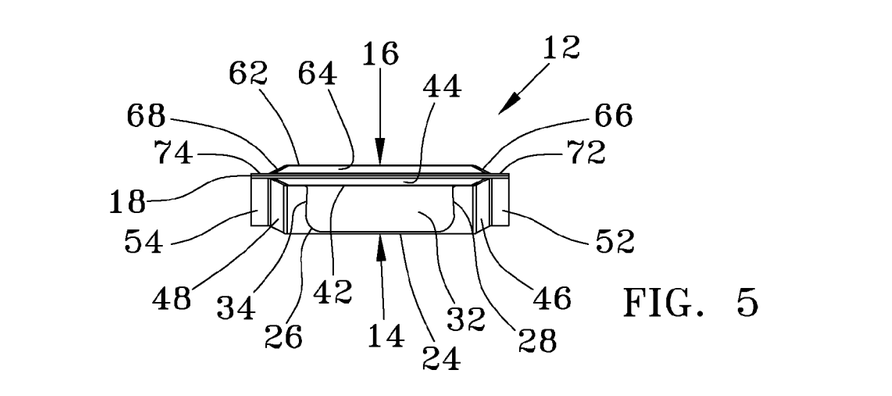
FIG. 5 is a rear elevation view of the container.
Figure 6:
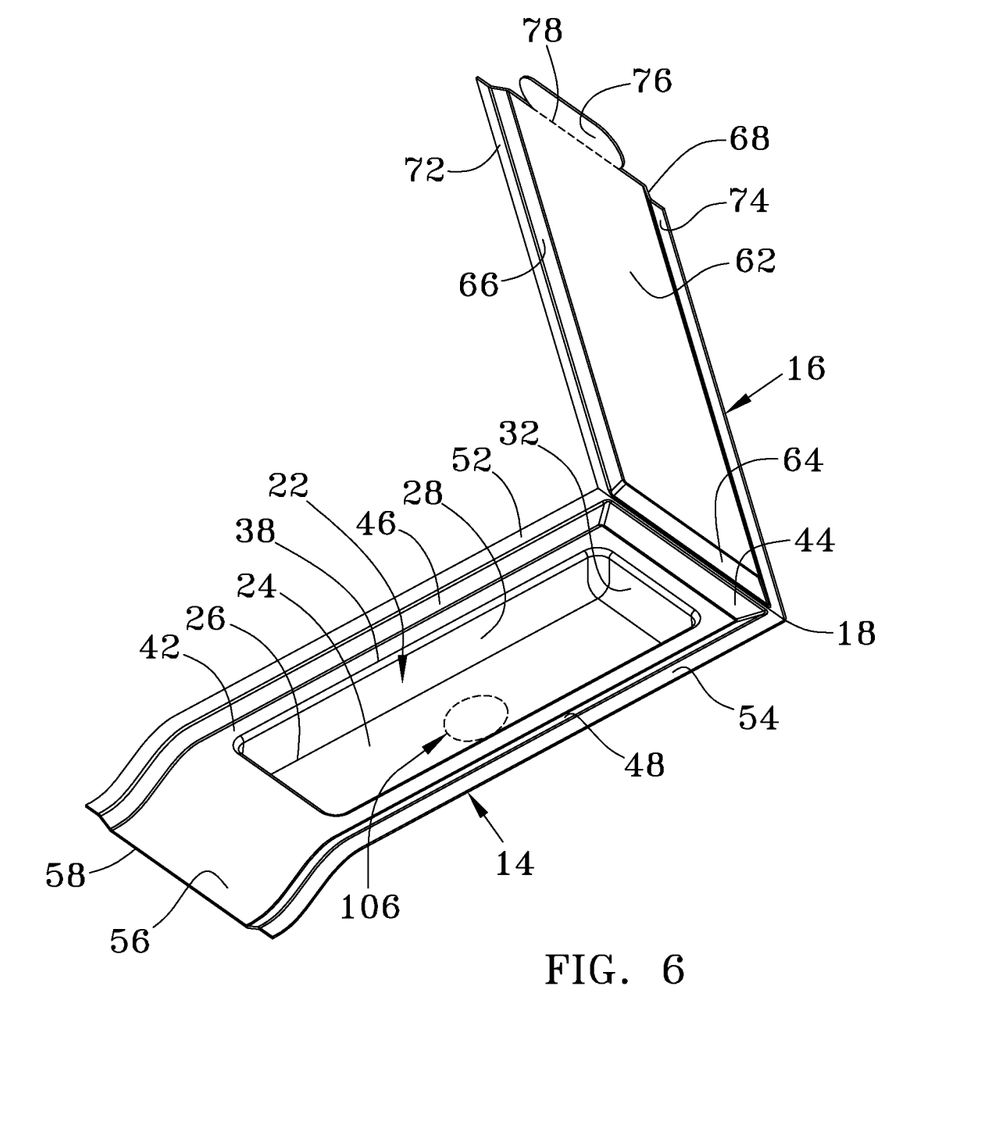
FIG. 6 is a perspective view of one piece of the container including the container bottom part and top part.
Figures 7, 8:
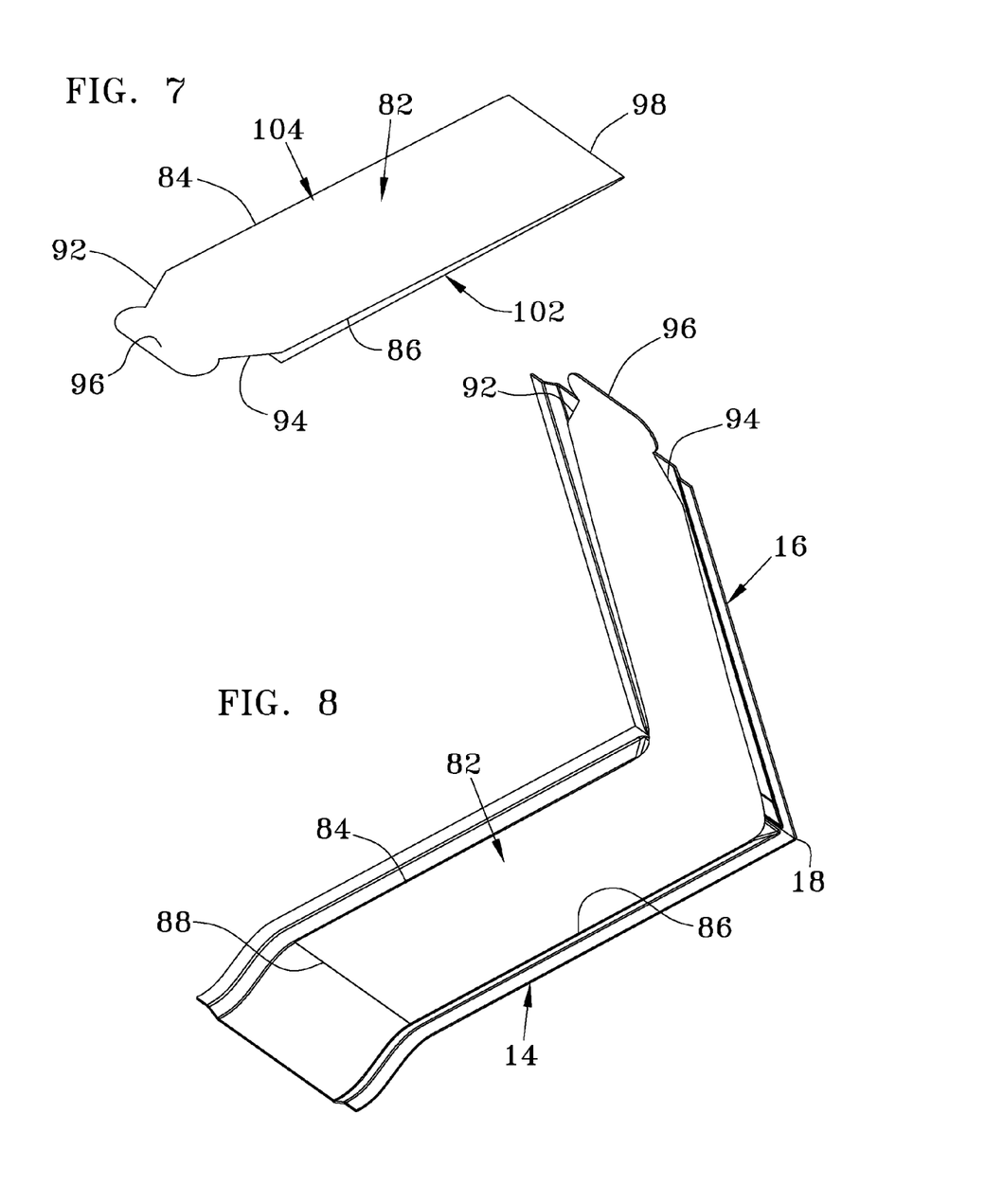
FIG. 7 is a perspective view of the second piece of the container, the flexible sealing sheet.
FIG. 8 is a perspective view of the sheet being assembled to the bottom part and top part of the container.
Figure 9:
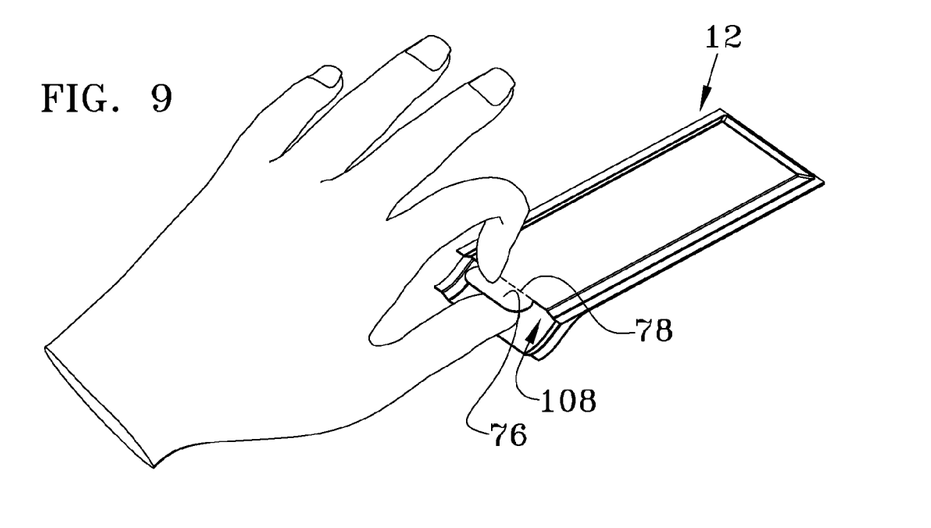
FIG. 9 is a perspective view illustrating manually grasping the tab of the container.
Figure 10:
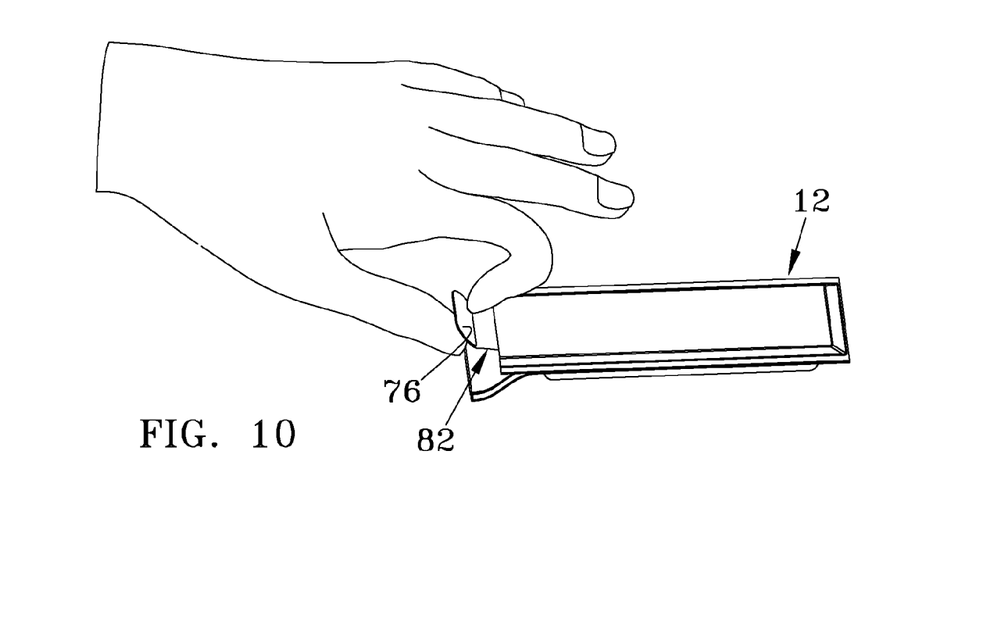
FIG. 10 is a perspective view illustrating manually separating the tab from the container and pulling the sheet from the container.
Figure 11:
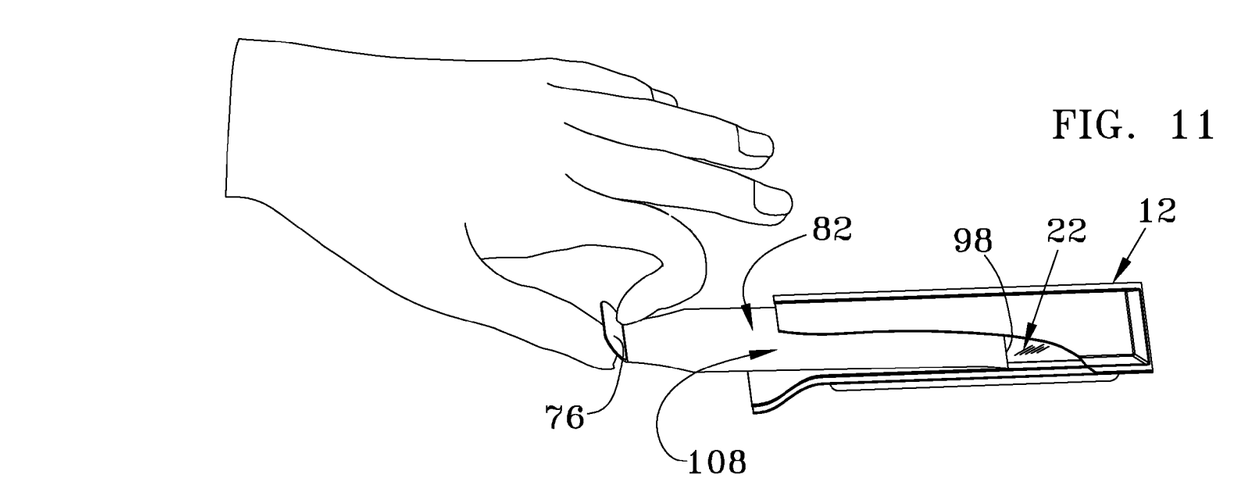
FIG. 11 is a view similar to that of FIG. 10, but showing a partial view of the container and the process of pulling the sheet from the container.
Figure 12:
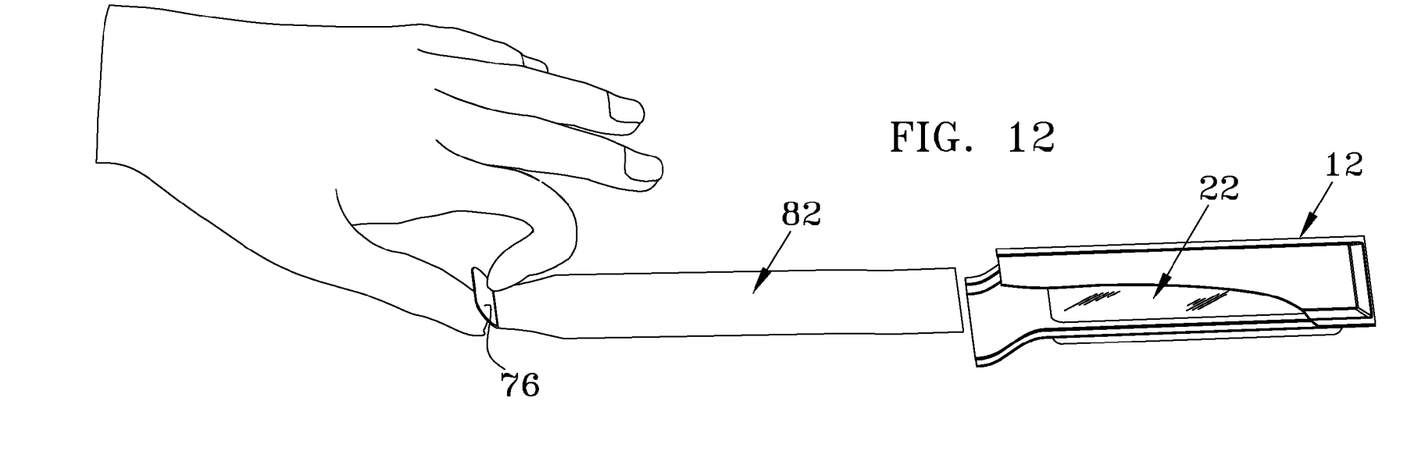
FIG. 12 is a view similar to that of FIG. 11, but showing the sheet removed from the container exposing the evaporative substance in the container.

The container 12 of the invention is shown assembled in FIGS. 1-5 and is shown disassembled in FIGS. 6 and 7. As stated earlier, the container 12 has a two-piece construction. One piece forms the exterior of the container 12 and the other piece is a flexible sheet that seals the contents of the container. The basic two piece construction of the container enables it to be manufactured easily and inexpensively. This results in the container being offered to consumers at a reduced price.

The first piece of the disassembled container is shown in FIG. 6. The first piece forms both the bottom part 14 and top part 16 of the container exterior. The two parts are connected by a hinge 18 that extends along the back of the assembled container. In the exemplary embodiment the bottom part 14, top part 16 and hinge 18 are all molded of a semi-rigid plastic, or other similar material. Although the parts of only one container 12 are shown in FIG. 6, it is possible that several containers can be molded from a single sheet of plastic material and then subsequently separated from each other. Additionally, although the top part 14 and bottom part 16 of the container shown in FIG. 6 have complementary rectangular configurations, the container 12 could be formed with other configurations such as a circular configuration, a triangular configuration, etc.

The container bottom part 14 has a central area that is formed as a receptacle 22 for the ant bait to be contained in the container. The receptacle 22 has a generally rectangular bottom surface 24 defined by a rectangular perimeter edge 26 of the bottom surface. Four sidewalls 28, 32, 34, 36 extend upwardly from the bottom surface perimeter edge 26. In another embodiment of the container having a circular configuration, the container receptacle would have a cylindrical configuration with a circular bottom surface and a single cylindrical sidewall. Together the sidewalls 28, 32, 34, 36 and the bottom surface 24 define the receptacle 22. The top edges of the sidewalls 28, 32, 34, 36 define a perimeter edge 38 of an open top of the receptacle 22. A substantially flat, rectangular border surface 42 extends around the open top perimeter edge 38. An upwardly angled rear flange 44 extends from the back of the border surface 42 to the hinge 18. A pair of upwardly angled left 46 and right 48 flanges extend along the opposite sides of the border surface 42 as viewed in FIG. 6. The left 46 and right 48 side flanges extend upwardly to respective left 52 and right 54 side strips as viewed in FIG. 6. The two side strips 52, 54 are substantially coplanar. An inclined surface 56 extends downwardly from the forward ends of the border surface 42, the left 46 and right 48 flanges and the left 52 and right 54 side strips. As the incline surface 56 extends away from the receptacle 22 it angles downwardly to a forward edge 58 of the surface. The forward edge 58 is in substantially the same plane as the receptacle bottom surface 24.

The container top part 16 has a similar configuration to that of the bottom part 14 although it does not include a receptacle 22. The top part 16 has a central area defined by a substantially flat top surface 62. The top surface 62 has basically the same configuration as the bottom part border surface 42, although slightly longer in length. Although the top surface 62 is shown as a continuous surface, it could also have one or more holes. The top surface 62 is connected to the hinge 18 by a rear flange 64. The rear flange 64 is angled upwardly as it extends from the hinge 18 to the top part 62. The top part 16 also has an upwardly angled left flange 66 and an upwardly angled right flange 68, as well as a left side strip 72 and a right side strip 74. The left flange 66 and right flange 68 angle upwardly as they extend from the respective left strip 72 and the right strip 74 to the top surface 62. The left strip 72 and right strip 74 are also substantially coplanar. A tab 76 is formed at the forward edge of the top surface 62. The tab 76 is connected to the top surface 62 by a frangible connection, for example a line of perforations 78. Other types of frangible connections could be employed to secure the tab 76 to the top surface 62.

The flexible sheet 82 of the container 12 is shown disassembled from the container in FIG. 7. The sheet 82 can be constructed of any known material typically employed in hermetically sealing packages such as plastic, foil, etc. The sheet 82 has an elongate length with a pair of parallel left 84 and right 86 side edges that extend along a majority of the sheet length to an end edge 88 of the sheet. The end edge 88 is substantially perpendicular to the side edges 84, 86. The width of the sheet between the side edges 84, 86 is substantially the same as the width of the flat border surface 42 of the container bottom part 14. A pair of inwardly angled edges 92, 94 extend forwardly from the respective left 84 and right 86 side edges of the sheet. The angled edges 92, 94 extend forwardly to a tab 96 formed on the sheet 82. The tab 96 has substantially the same configuration as the tab 76 on the container top part 16. In an alternate embodiment the tab 96 could just be an extension of the sheet and not have the configuration shown. When the sheet is assembled into the container 12 it is folded over at a fold 98. The folded sheet has a lower piece 102 and an upper piece 104.

After the ant bait or other substance 106 has been positioned in the receptacle 22, the sheet 82 is assembled to the container 12 as shown in FIG. 8. The end edge 88 of the sheet is positioned adjacent the forward end of the border surface 42 of the container bottom part 14. In an alternate embodiment the sheet end edge 88 could be positioned adjacent the forward edge 58 of the inclined surface 56. The lower piece 102 of the sheet is laid across the border surface 42 and over the receptacle 22. The portion of the sheet lower piece 102 that engages with the border surface 42 is removably secured to the border surface by adhesives, by heat sealing, by RF welding, or by other equivalent means. The fold 98 of the sheet is positioned adjacent the container hinge 18. From the fold 98 the sheet upper piece 104 extends across the top surface 62 of the container top piece 16. This portion of the sheet is not secured to the top surface 62 or any other portion of the container top piece 16. However, the tab 96 of the sheet is secured by adhesives, heat sealing, RF welding or other equivalent means to the container top piece tab 76.

With the sheet 82 assembled to the container bottom part 14 and top part 16 as shown in FIG. 8, the container top part 16 is folded over the bottom part 14 to complete the assembly of the container 12 as shown in FIGS. 1-5. The angled flanges of the bottom part 44, 46, 48 and the angled flanges of the top part 64, 66, 68 space the top part tab 76 above the inclined surface 56 and form an opening 108 into the container interior. The side strips 52, 54 of the container bottom part 14 and the respective side strips 72, 74 of the container top part 16 are secured together by adhesives, by heat sealing, by RF welding or by other equivalent means. This completes the assembly of the container.

Use of the container 12 is shown in FIGS. 9-12. In use of the container 12, the tab 76 of the container top part 16 and the connected tab 96 of the sheet 82 are manually grasped and pulled from the remainder of the container. When the top part tab 76 separates from the top surface 62, continued pulling of the container tab 76 and the connected tab 94 of the sheet will pull the sheet through the container opening 108. Continued pulling will gradually cause the sheet lower piece 102 to peel away from the border surface 42 of the container bottom part 14. Continued pulling will remove the sheet 82 from the interior of the container 14 and expose the ant bait 106 in the receptacle 22 to the exterior environment of the container through the container opening 108. Still further pulling will separate the sheet 82 from the container 12. The container 12 is then ready for use as an ant trap. When placed on a floor surface, the inclined surface 56 provides access to the opening 108 and the ant bait in the container interior.

Although the container 12 is described above is being used as an ant trap containing an ant bait, it should be appreciated that the container can be used to contain any substance, for example other types of insect baits, or air fresheners, or animal repellents, or other types of substances. Additionally, although the container 12 is described as having only one receptacle 22, it should be appreciated that the container could be formed with multiple receptacles positioned side-by-side along the flat border surface 42 of the container bottom part 14. Pulling the sheet 82 from the container could be stopped after one of the receptacles 22 is uncovered, exposing the substance of the one receptacle to the exterior environment of the container through the opening 108. Once the substance in the one receptacle is no longer useful, the sheet 82 could then be further pulled from the container to expose the second receptacle to the exterior environment.

Still further, although the container 12 has been described with the bottom part 14 and top part 16 being connected by a hinge 18, the container could be constructed with the bottom part 14 and top part 16 being separate parts.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed:

1. A container comprising:
    a container bottom part having a central area;
    a substance on the bottom part central area;
    a sheet covering over the bottom part central area and the substance on the central area, the sheet being removably secured to the bottom part around the central area, the sheet having a sheet tab that is not secured to the bottom part;
    a container top part covering over the sheet and the bottom part, the top part being secured to the bottom part around the sheet except for an area of the bottom part adjacent the sheet tab thereby forming an opening of the container between the top part and the bottom part adjacent the sheet tab, the top part having a top part tab, the top part tab being connected to the top part by a frangible connection, the top part tab projecting outwardly from the opening of the container and the top part tab being secured to the sheet tab with no other portion of the top part being secured to the sheet; whereby,
    the top part tab and the sheet tab can be manually grasped and pulled together away from the container opening to break the frangible connection, separate the top part tab from the top part, remove the sheet from covering over the bottom part central area and the substance on the central area and to remove the sheet from between the bottom part and the top part through the container opening; and,
    the container bottom part having an inclined surface adjacent the container opening, the inclined surface extending downwardly away from the container opening and away from the container central area to an edge of the inclined surface, the edge being in substantially a same plane as the container central area spacing the top part tab and the sheet tab above the inclined surface.

2. The container of claim 1, further comprising:
    the substance being ant bait.

3. The container of claim 1, further comprising:
    the bottom part and the top part being one-piece with a hinge connecting the bottom part and the top part and the top part being folded at the hinge over the bottom part.

4. The container of claim 3, further comprising:
    the container opening being on an opposite side of the container from the hinge.

5. The container of claim 1, further comprising:
    the sheet being folded over and having a fold in the sheet between a lower piece of the sheet and an upper piece of the sheet, the sheet lower piece having a length that extends from the container opening between the bottom part and the top part of the container, over the bottom part central area and the substance on the central area to the fold in the sheet, and the sheet upper piece having a length that extends from the fold over the sheet lower piece and between the sheet lower piece and the top part of the container to the container opening.

6. The container of claim 5, further comprising:
    the sheet lower piece being removably secured to the bottom part around the central area and the sheet top piece not being secured to the bottom part.

7. The container of claim 1, further comprising:
    the bottom part having a generally rectangular configuration; and,
    the top part having a generally rectangular configuration.

8. The container of claim 1, further comprising:
    the top part tab and the sheet tab having a same configuration.

9. A container comprising:
    a container bottom part with a bottom surface and a perimeter edge extending around the bottom surface, at least one sidewall extending around the bottom surface perimeter edge and extending upwardly from the bottom surface perimeter edge to a top edge of the sidewall, together the bottom surface and the sidewall forming a receptacle having an open top surrounded by the sidewall top edge;
    a substance in the receptacle;
    a sheet extending over the receptacle open top and the sidewall top edge, the sheet be removably secured to the sidewall top edge, the sheet having a sheet tab that is not secured to the sidewall top edge;

a top part of a container extending over the sheet and the sidewall top edge, the top part being secured to the sidewall top edge around the sheet except for one area of the sidewall top edge where the top part and sidewall top edge are not secured together leaving a container opening between the top part and the sidewall top edge, the top part having a top part tab, the top part tab being connected to the top part by a frangible connection, the top part tab projecting outwardly from the container opening and the top part tab being secured to the sheet tab with no other portion of the top part being secured to the sheet;

the top part tab and the sheet tab being accessible at the container opening where the top part tab and the sheet tab can be manually grasped and pulled together away from the container opening to thereby, break the frangible connection, separate the top part tab from the top part and remove the sheet from over the receptacle open top and from the sidewall top edge through the container opening; and, the container bottom part having an inclined surface adjacent the container opening, the inclined surface extending downwardly away from the container opening and away from the container receptacle to an edge of the inclined surface, the edge being in substantially a same plane as the container bottom surface spacing the top part tab and the sheet tab above the inclined surface.

10. The container of claim 9, further comprising:
the substance being ant bait.

11. The container of claim 9, further comprising:
the bottom part and the top part being one-piece with a hinge connecting the bottom part and the top part and the top part being folded at the hinge over the bottom part.

12. The container of claim 11, further comprising
the opening being on an opposite side of the container from the hinge.

13. The container of claim 9, further comprising:
the sheet being folded over and having a fold in the sheet between a lower piece of the sheet and an upper piece of the sheet, the sheet lower piece having a length that extends from the container opening between the top part and the bottom part of the container, over the receptacle and the substance to the fold in the sheet, and the sheet upper piece having a length that extends from the fold over the sheet lower piece and between the sheet lower piece and the top part to the container opening.

14. The container of claim 13, further comprising:
the sheet lower piece being removably secured to the bottom part around the receptacle and the sheet top piece not be secured to the bottom part.

15. The container of claim 9, further comprising:
the bottom part and the top part having generally rectangular configurations.

16. The container of claim 9, further comprising:
the top part tab and the sheet tab having a same configuration.

17. A container comprising:
a container bottom part with a bottom surface and a perimeter edge extending around the bottom surface, at least one sidewall extending around the bottom surface perimeter edge and extending upwardly from the bottom surface perimeter edge to a top edge of the sidewall, together the bottom surface and the sidewall forming a receptacle having an open top surrounded by the sidewall top edge;

a substance in the receptacle;

a sheet extending over the receptacle top opening and the sidewall top edge, the sheet being removably secured to the sidewall top edge, the sheet having a sheet tab that is not secured to the sidewall top surface, whereby the sheet tab can be manually grasped and pulled from the sidewall top edge to remove the sheet from over the receptacle open top and the sidewall top edge to expose the substance in the receptacle;

a container top part having a perimeter edge that is adapted to be secured to the sidewall top edge around the sheet except for one area of the sidewall top edge where the top part and the sidewall top edge are not to be secured together leaving a container opening between the top part and the sidewall top edge, the top part having a top part tab, the top part tab being connected to the top part by a frangible connection, the top part tab projecting outwardly from the container opening and the top part tab being secured to the sheet tab with no other portion of the top part being secured to the sheet;

the sheet tab and the top part tab being accessible at the container opening for being manually grasped and pulled together from the container opening to break the frangible connection, separate the top part tab from the top part and remove the sheet from over the receptacle top opening; and, the container bottom part having an inclined surface adjacent the container opening, the inclined surface extending downwardly away from the container opening and away from the container receptacle to an edge of the inclined surface, the edge being in substantially a same plane as the container bottom surface spacing the top part tab and the sheet tab above the inclined surface.

18. The container of claim 17, further comprising:
the substance being ant bait.

19. The container of claim 17, further comprising:
the bottom part and the top part being one piece with a hinge connecting the bottom part and the top part and the top part being folded at the hinge over the bottom part.

20. The container of claim 17, further comprising:
the top part tab and the sheet tab having a same configuration.

* * * * *